Patented Dec. 8, 1942

2,304,098

UNITED STATES PATENT OFFICE 2,304,098

PROCESS OF PREPARING ZINC PEROXIDE

Newton C. Jones and Donald O. Notman, Niagara Falls, N. Y., assignors to E. I. du Pont de Nemours & Company, Wilmington, Del., a corporation of Delaware No Drawing. Application October 21, 1938, Serial No. 236,326

5 Claims. (Cl. 23—147)

This invention relates to a new therapeutical zinc peroxide product and to a process for preparing this new therapeutical zinc peroxide product.

It has been found that for the treatment of diseases caused by haemolytic streptococci and other similar organisms and also for the treatment of various other diseases of the epidermis, zinc peroxide preparations of certain properties are valuable therapeutical agents. It has been found that it is especially the amount of active oxygen which is given off under certain conditions which is of especial importance for the germicidal effect and that such therapeutical agents should meet certain strict specifications. Thus it has been found that for obtaining best germicidal properties such a therapeutical zinc peroxide product should have a gas evolution above 0.35 cc. per hour during the last 4 hours of a 24 hour gas evolution test which consists in heating a slurry containing 25 grams zinc peroxide in 125 cc. distilled water at 37.5° C. Besides this it is also desirable that the therapeutical zinc peroxide product has substantially no tendency to cake when subjected to the action of water and contains substantially no gritty material.

We have found a new therapeutical zinc peroxide product which meets the above outlined specifications.

In a copending application of Walter Klabunde, Paul LaFrone Magill and Joseph S. Reichert, Serial Number 244,918, filed December 10, 1938, a new therapeutical zinc peroxide product is disclosed which has a powdery finely divided form and is substantially free from gritty material, retaining its finely divided form and remaining substantially non-tacky when contacted with water. This new therapeutical product disclosed in this copending application may be prepared conveniently by adjusting the pH of the reaction mixture obtained by mixing a zinc salt solution with an active yielding soluble compound to a pH above 9.5, preferably to a pH of about 10.5. Thus a uniform product containing substantially no gritty material and having substantially no tendency to cake in the presence of water is obtained. According to a preferred form of carrying out the process of this copending application a zinc salt solution such as a solution of zinc chloride and a solution of a soluble oxygen yielding compound such as sodium peroxide are added to each other simultaneously at a controlled slow rate of addition and the pH of the resultant mixture is controlled within the desired pH range. According to this modified procedure the preferred range of pH is somewhat lower than when starting from a batch containing the total amount of the reactants and even pH values as low as 8.5 can be utilized. It has been found advantageous to control the pH of the reaction mixture throughout the reaction so that no substantial variations in the pH occur and even local variations in the pH value are avoided. Preferably the pH is adjusted to a pH value of about 9 to 9.5, pH values up to 11 still being satisfactory. By further increasing the pH gel-like zinc peroxide products can be obtained which can be used for therapeutical purposes where non-powdery materials are desired. The feeding rate of the reactants according to this preferred form of the copending application should be relatively slow and vigorous stirring should be provided for in the reaction vessel. The relative amounts and the relative feeding velocity of the solution of the reactants of course are dependent on their concentration and temperature. Thus for an aqueous solution of zinc chloride containing about 18 grams zinc peroxide per liter of water and an aqueous solution of sodium peroxide containing about 10 grams sodium peroxide per liter of water a feeding rate of up to 0.5 liters per minute for each of the solutions is suitable and even speeds up to 1.5 liters per minute give satisfactory results. For higher concentrations of course lower feeding rates will be suitable and for lower concentrations higher feeding rates can be used; as a rule in the same type of apparatus it may be said that about the same amount of zinc should be fed into the reaction vessel per minute. Of course when changing the dimensions of the apparatus, for example when changing the diameter of the feeding pipes or the like, the conditions will have to be varied accordingly. In any case where the dimensions of the feeding device are not exceedingly small an efficient stirring device should be provided in the reaction vessel so as to provide immediate and thorough mixing of the reactants.

An object of the present invention is a new therapeutical zinc peroxide product having a gas evolution rate greater than 0.35 cc. per hour. Another object of the present invention is a new therapeutical zinc peroxide product having a gas evolution rate greater than 0.35 cc. per hour and which is substantially free from gritty material and which is substantially not subject to caking in the presence of water. Another object of the invention is to provide an improved process for preparing zinc peroxide having an increased activity. Further objects of the invention will be hereinafter apparent.

Our new therapeutical zinc peroxide in accordance with the above objects of our invention is characterized by meeting the following specifications:

A slurry of 25 grams of zinc peroxide sterilized as hereinafter described in 125 cc. of distilled water is subjected to a heat treatment at 37.5° C. for 24 hours and the average gas evolution during the last 4 hours of this treatment is determined. Our new product is characterized by the fact that when it is subjected to this test the gas evolution during the last 4 hours of this 24 hour treatment is greater than 0.35 cc. per hour in the average. The term "gas evolution rate in cc. per hour" as used throughout the specification and in the appended claims is meant to indicate this average gas evolution during the last 4 hours of the above described 24 hour gas evolution test.

Besides this property it is desirable that the product meets the following specification. A sample of 5 grams of zinc peroxide which has been dry sterilized by heating approximately 100 grams of zinc peroxide in a 250 cc. Ehrlenmeyer flask at 140° C. for 4 hours and which has then been cooled to room temperature and thoroughly mixed is introduced into a 50 cc. glass stoppered graduated cylinder. Distilled water is added to the 50 cc. mark and the mixture thoroughly shaken. In case the volume decreases water is added to fill the cylinder up to the 50 cc. mark. The cylinder is then set into a 29° C. bath and is covered with a beaker instead of the stopper and retained therein for 24 hours. Then the cylinder is taken out of the bath and a glass rod of 20 inches length and ⅛ inch diameter is dropped into the undisturbed precipitate and the volume through which the rod does not penetrate is noted. The contents of the cylinder then are poured out and the cylinder is refilled with water and emptied again without shaking. This procedure is repeated twice and the volume of cake retained in the bottom of the cylinder and any scale adhering to the sides is noted. Preferably our product should when subjected to this test not adhere to the walls of the cylinder after three simple washings and no substantial amount of cake or scale should remain in the cylinder and the glass rod when dropped into the cylinder before the washing should drop to the bottom of the cylinder. Furthermore, our product should not contain any substantial amounts of gritty material, a fact which can be easily determined by mere inspection. When shaken with 20 times the amount of distilled water by weight and allowed to stand for at least 50 minutes our product should produce in the slurry a pH not higher than 8.8.

A convenient way of preparing our new therapeutical zinc peroxide product consists in incorporating in the zinc peroxide small amounts of copper or manganese compounds or of copper and manganese compounds. According to our invention these copper and manganese compounds are incorporated into the zinc peroxide by adding them to the raw materials while preparing the zinc peroxide at any time prior to the complete formation of zinc peroxide. By incorporation of these activating agents prior to complete formation of the zinc peroxide product these activating agents are finely and uniformly distributed throughout the zinc peroxide, and accordingly very small amounts will bring about the desired effect. Thus by preventing any local higher concentration of these activating agents any undesired premature decomposition of the zinc peroxide is avoided. It has also been found that when adding such activating compounds to the ready product not only a less uniform distribution of the activating agent is obtained but also the physical properties of the product are substantially affected. As is obvious small amounts of such activating agents can only be incorporated into the ready product by treating it with a dilute solution of the activating agents. However, when treating the ready product with an aqueous solution of the activating agents and drying the product thereafter, the zinc peroxide is transformed into a badly caking material and thus is excluded from many applications such as from the treatment of wounds, where it is necessary that the applied material can be easily removed. Surprisingly enough, we have found that it is especially advantageous to add these activating compounds to the zinc compound which is to be reacted with an oxygen yielding compound to form the desired zinc peroxide and that, in spite of the presence of these activating agents during the reaction, not only no appreciable loss in the peroxygen oxygen occurs but also the activity of the resulting zinc peroxide is substantially increased. Thus by the process of the present invention a therapeutical zinc peroxide product is easily obtained which has a gas evolution substantially over 0.35 cc. per hour while heretofore only products with a substantially smaller gas evolution have been obtained such as up to 0.30 cc. per hour, higher gas evolutions only occurring accidentally.

Preferably, we prepare our new therapeutical zinc peroxide product by adding the copper or manganese compounds or copper and manganese compound to a zinc salt solution and reacting the zinc salt solution with a solution of an oxygen yielding compound by adding the solutions to each other simultaneously at a controlled slow feeding rate and by adjusting the pH of the resulting reaction mixture throughout the reaction to a pH of above 8.5, preferably within the range of about 9 to 9.5. Since the reaction leading to the formation of zinc peroxide proceeds rapidly the rate of feeding for the solutions of the reactants should be relatively slow and it is also advantageous to stir the reaction mixture vigorously. The feeding rate of the solutions is preferably kept within the range outlined above when describing the process of the copending application of Walter Klabunde, Paul La Frone Magill and Joseph S. Reichert, Serial Number 244,918, filed December 10, 1938. It is also advantageous to keep the temperature during the reaction rate low; for example, at temperatures of about 18° C. so as to avoid any excessive losses of active oxygen. The resultant zinc peroxide slurry preferably is then kept at lower temperatures such as temperatures of about 0 to 5° C. Various variations will be apparent to those skilled in the art.

Zinc peroxide prepared in the above described manner has besides the increased activity marked advantages over the products obtained by the process heretofore used. Thus zinc peroxide obtained in the above described way has besides a highly increased gas evolution substantially no tendency to cake in the presence of water and is substantially free of gritty material. Also the amount of soluble oxygen is about 30% higher than in the products heretofore obtained.

The amounts of copper or manganese compounds or copper and manganese compounds which can be used according to our invention may vary within wide limits. Even exceedingly small amounts bring about a marked effect. Preferably, however, not less than 9 parts per million of copper or manganese or copper and manganese in the form of their compounds should be added. Over 15 parts per million of these activating agents give very satisfactory results and preferably we add about 20 parts per million, additions over about 40 parts per million mostly having no beneficial effects. The parts per million as given above are based on parts by weight based on the weight of the zinc peroxide product. It is advantageous to utilize these activating agents in combination and not replace either one completely with the other one. The optimum amount to be used will be dependent upon the specific composition of the product, the method of preparation of the product and also on the presence of impurities in the product. Thus in case the zinc peroxide contains impurities which have activating properties themselves relatively smaller additions of copper and/or manganese will produce optimum effects while with impurities having a stabilizing action larger additions of amounts will be necessary.

Our invention is further illustrated by the following example:

*Example*

185 pounds of anhydrous zinc chloride were dissolved in about 118 gallons of water and 3.6 liters of C. P. hydrochloric acid (sp. gr. 1.19) were added to dissolve the precipitate formed by partial hydrolysis of the zinc chloride. 0.80 grams of $CuCl_2.2H_2O$ and 2.90 grams of $MnCl_2.4H_2O$ were added to this zinc chloride solution. The thus prepared solution was cooled to 7–8° C. and maintained at this temperature. At the same time a sodium peroxide solution was prepared from 104 pounds of sodium peroxide and 118 gallons of water. This sodium peroxide solution was cooled to about 12° C. and maintained at this temperature.

The zinc chloride solution containing the activating agents and the sodium peroxide solution were then passed from two separate feeding vessels through sensitive flow-meters into a small vessel, where they were thoroughly mixed by a high speed stirrer. The rate of addition of each of the solutions was kept at about 0.6 liters per minute. The actual feeding speed of each of the solutions, however, was at all times regulated so as to maintain the pH in the mixer between 9.0 and 9.5.

After passing through the mixer, which required about 2–3 minutes, the slurry was fed into a large storage vessel. The temperature in this vessel was kept at about 0°–5° C. Also, in this vessel the pH was controlled within the range of 9.0 to 9.5, if necessary, by the suitable addition of zinc chloride or sodium peroxide solutions respectively.

The slurry then was run into a filter box and was filtered off under suction. The residue was washed four times and care was taken that the wet product was not in contact with air for any appreciable time, to prevent wet carbonation.

The zinc peroxide then was removed from the filter and dried in an air dryer at 55°–60° C. for 15–20 hours. After about 5 hours' drying the material was broken up to secure more uniform drying. The dry material was rapidly passed through a micro mill until at least 99% of the product passed a 100 mesh screen.

If desired the resulting product then can be carbonated by agitating from 30 to 45 minutes in an atmosphere of $CO_2$ to lower the pH of the final product. However, the pH of the final product as obtained by this process is about 7.8, so that usually carbonation is not necessary, if not so desired for other purposes.

Carbonated 100 g. samples of this material and of parallel runs made under analogous conditions were then subjected to sterilization at 140° C. in an oven for about 4 hours.

The ready samples then were tested for their gas evolution rate by taking 25 g. of each and forming a slurry with 125 cc. water and subjecting said slurry to a heat treatment at 37.5° for 24 hours. The total gas evolution in the 24 hour period averages about 30 cc. and the variation in the samples of different batches ranged within about 24 to 36 cc. of evolved gas for 24 hours. The gas evolution rate in the last 4 hours of this 24 hour test averaged about 0.42 cc. per hour, the different values ranging between 0.38 and 0.57 cc. per hour.

The amount of soluble oxygen of these samples was determined by adding 5 g. of zinc peroxide to 100 cc. of 37.5° C. distilled water and allowing the mixture to stand for two hours at this temperature. The slurry then was filtered and titrated with about 0.02 normal potassium permanganate solution in the usual way. The samples had an average of about 0.018% by weight soluble oxygen based on the weight of the sample, the values of individual samples varying between about 0.015 to 0.025%.

The invention, however, is not restricted to the specific procedure of the example, but is to be understood in its broad scope as defined in the claims. The present invention is further not restricted to any specific zinc compounds as starting materials or any specific process for preparing the zinc peroxide, and any zinc compounds suitable for the preparation of zinc peroxide, such as zinc hydroxide or zinc sulfate, can be used according to the process of the present invention. However, when adding the activating compounds to the zinc compounds before the reaction proper, it is preferred to use zinc salt solutions as starting materials. Likewise, any suitable active oxygen-yielding substance can be used, such as hydrogen peroxide, alkali metal peroxides and per salts, earth alkaline peroxides and per salts, or any other suitable inorganic or organic active oxygen-yielding per compounds as are known to those skilled in the art. The invention furthermore is not restricted to the use of a specific amount of copper or manganese or copper and manganese, the amount used being determined by the desired activity of the product. However, too large amounts should be avoided, since the addition of too large amounts of copper or manganese salts might lead to decomposition of the product and might affect the stability of the dry product and lead to too violent liberation of oxygen on application of the zinc peroxide.

The average zinc peroxide content of the various commercial zinc peroxide products usually varies within wide limits, and the terms "zinc peroxide" and "zinc peroxide product," as used in the specification, are to be understood to comprise all such products being wholly or only partially composed of pure zinc peroxide. Commercial zinc peroxide products usually contain about 40 to 55% of pure zinc peroxide as determined by the active oxygen content of the product and sterilized commercial zinc peroxide products contain considerably smaller amounts of pure zinc peroxide, e. g. as low as 20%. Our invention, however, is not restricted to these percentages, and may be applied to zinc peroxide containing substantially lower amounts of pure zinc peroxide, as well as substantially higher amounts of pure zinc peroxide.

It is apparent that various widely different modifications of our invention may be practiced without departing from the spirit and the scope thereof. The invention is therefore not limited by the foregoing description and examples except as indicated in the appended claims.

We claim:

1. The process for preparing zinc peroxide for therapeutical uses which comprises reacting a zinc compound and an active oxygen-yielding compound and introducing into the reaction mixture resulting from said zinc compound and active oxygen-yielding compound prior to complete reaction at least one of the group consisting of copper and manganese compounds as an activating agent for the resulting zinc peroxide.

2. The process for preparing zinc peroxide for therapeutical uses which comprises reacting a zinc compound and an active oxygen-yielding compound and introducing into the reaction mixture resulting from the zinc compound and the active oxygen-yielding compound prior to complete reaction at least 9 parts per million of at least one of the group consisting of copper and manganese in the form of their compounds as an activating agent for the resulting zinc peroxide.

3. The process for preparing zinc peroxide for therapeutical uses which comprises reacting a zinc compound and an active oxygen-yielding compound and introducing into the reaction mixture resulting from the zinc compound and the active oxygen-yielding compound from about 15 to 40 parts per million of one of the group consisting of copper and manganese in the form of their compounds as activating agents for the resulting zinc peroxide.

4. The process of preparing zinc peroxide which comprises reacting a zinc salt solution with a solution of an active oxygen-yielding, water-soluble compound, and of adding the reactants to each other simultaneously at a controlled rate of addition, keeping the pH within the range of 8.5 to 11 throughout the addition of the reactants, and of incorporating in the reaction mixture prior to complete reaction at least one of a group consisting of copper and manganese compounds as an activating agent for the resulting zinc peroxide.

5. The process of preparing zinc peroxide for therapeutical uses which comprises reacting a zinc salt solution containing at least one compound of the group consisting of copper and manganese compounds and a solution of a water soluble active oxygen-yielding compound and adding the reactants to each other simultaneously at a controlled slow rate of addition equivalent to the addition of a zinc chloride solution containing 18 grams zinc chloride per liter of water and a sodium peroxide solution containing 10 grams sodium peroxide per liter of water to each other at a feeding rate of about up to 1.5 liters of each of the solution, and adjusting the resultant reaction mixture to a pH of above 8.5.

NEWTON C. JONES.
DONALD O. NOTMAN.

CERTIFICATE OF CORRECTION.

Patent No. 2,304,098. December 8, 1942.

NEWTON C. JONES, ET AL.

It is hereby certified that error appears in the printed specification of the above numbered patent requiring correction as follows: Page 1, first column, line 42, after "active" insert --oxygen--; page 3, second column, line 14, for "37.5°" read --37.5° C.--; line 16, for "averages" read --averaged--; and that the said Letters Patent should be read with this correction therein that the same may conform to the record of the case in the Patent Office.

Signed and sealed this 19th day of January, A. D. 1943.

Henry Van Arsdale,
Acting Commissioner of Patents.

(Seal)

CERTIFICATE OF CORRECTION.

Patent No. 2,304,098. December 8, 1942.

NEWTON C. JONES, ET AL.

It is hereby certified that error appears in the printed specification of the above numbered patent requiring correction as follows: Page 1, first column, line 42, after "active" insert --oxygen--; page 3, second column, line 14, for "37.5°" read --37.5° C.--; line 16, for "averages" read --averaged--; and that the said Letters Patent should be read with this correction therein that the same may conform to the record of the case in the Patent Office.

Signed and sealed this 19th day of January, A. D. 1943.

(Seal)

Henry Van Arsdale,
Acting Commissioner of Patents.